US006259973B1

United States Patent
Ehret et al.

(10) Patent No.: US 6,259,973 B1
(45) Date of Patent: Jul. 10, 2001

(54) PROCESS AND APPARATUS FOR CONTROLLING IN CLOSED LOOP A MOTION QUANTITY REPRESENTING VEHICLE MOTION

(75) Inventors: Thomas Ehret, Möglingen; Anton Van Zanten, Ditzingen; Rainer Erhardt, Stuttgart; Friedrich Kost, Kornwestheim; Uwe Hartmann, Stuttgart; Werner Urban, Vaihingen/Enz, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/981,364
(22) PCT Filed: Apr. 8, 1997
(86) PCT No.: PCT/DE97/00714
  § 371 Date: Jul. 16, 1998
  § 102(e) Date: Jul. 16, 1998
(87) PCT Pub. No.: WO97/39928
  PCT Pub. Date: Oct. 30, 1997

(30) Foreign Application Priority Data

Apr. 18, 1996  (DE) ............................... 196 15 311

(51) Int. Cl.$^7$ .................................................. B62D 6/00
(52) U.S. Cl. .............................................. 701/1; 180/197
(58) Field of Search ................ 701/72, 75, 80, 701/71, 82, 41, 70; 73/178 R; 303/146, 113.5, 24.1; 180/197

(56) References Cited

U.S. PATENT DOCUMENTS

| | | | | |
|---|---|---|---|---|
| 4,741,207 | * | 5/1988 | Spangler | 73/146 |
| 5,013,067 | * | 5/1991 | Mine et al. | 280/840 |
| 5,015,006 | * | 5/1991 | Takehara et al. | 280/707 |
| 5,211,453 | * | 5/1993 | Van Zanten et al. | 303/111 |
| 5,265,019 | * | 11/1993 | Harara et al. | 364/424.05 |
| 5,311,431 | * | 5/1994 | Cao et al. | 364/424.05 |
| 5,356,238 | * | 10/1994 | Musil et al. | 404/84.1 |
| 5,401,115 | * | 3/1995 | Musil et al. | 404/72 |
| 5,440,923 | * | 8/1995 | Arnberg et al. | 73/146 |
| 5,455,770 | * | 10/1995 | Hadeler et al. | 364/426.01 |
| 5,471,386 | * | 11/1995 | Hrovat et al. | 364/426.02 |

FOREIGN PATENT DOCUMENTS

| | | |
|---|---|---|
| 34 21 700 | 12/1984 | (DE) . |
| 34 17 423 | 11/1985 | (DE) . |
| 34 21 732 | 12/1985 | (DE) . |
| 41 21 954 | 1/1993 | (DE) . |
| 42 43 717 | 6/1994 | (DE) . |
| 43 25 413 | 5/1995 | (DE) . |

OTHER PUBLICATIONS

Van Zanten, A. et al., "FDR—Die Fahrdynamik—regelung von Bosch", *ATZ Automobiltechnische Zeitschrift*, Nov. 1994, pp. 674–689.

* cited by examiner

Primary Examiner—Tan Nguyen
Assistant Examiner—Dalena Tran
(74) Attorney, Agent, or Firm—Kenyon & Kenyon

(57) ABSTRACT

An apparatus and a process for closed loop control of a motion quantity representing the vehicle motion which means determine the yaw rate of the vehicle, the longitudinal speed of the vehicle, and the transverse acceleration of the vehicle. Moreover, the apparatus influences the forward moment and/or the braking moment of individual wheels of the vehicle. The apparatus further determines a transverse acceleration component dependent on the roadway transverse inclination, as well as correcting the transverse acceleration of the vehicle at least as a function of the transverse acceleration component dependent on the roadway transverse inclination. The determination of the transverse acceleration component dependent on the roadway transverse inclination and also the correction of the transverse acceleration of the vehicle as carried out in a stable state of the vehicle characterized by the yaw rate and the transverse acceleration.

13 Claims, 9 Drawing Sheets

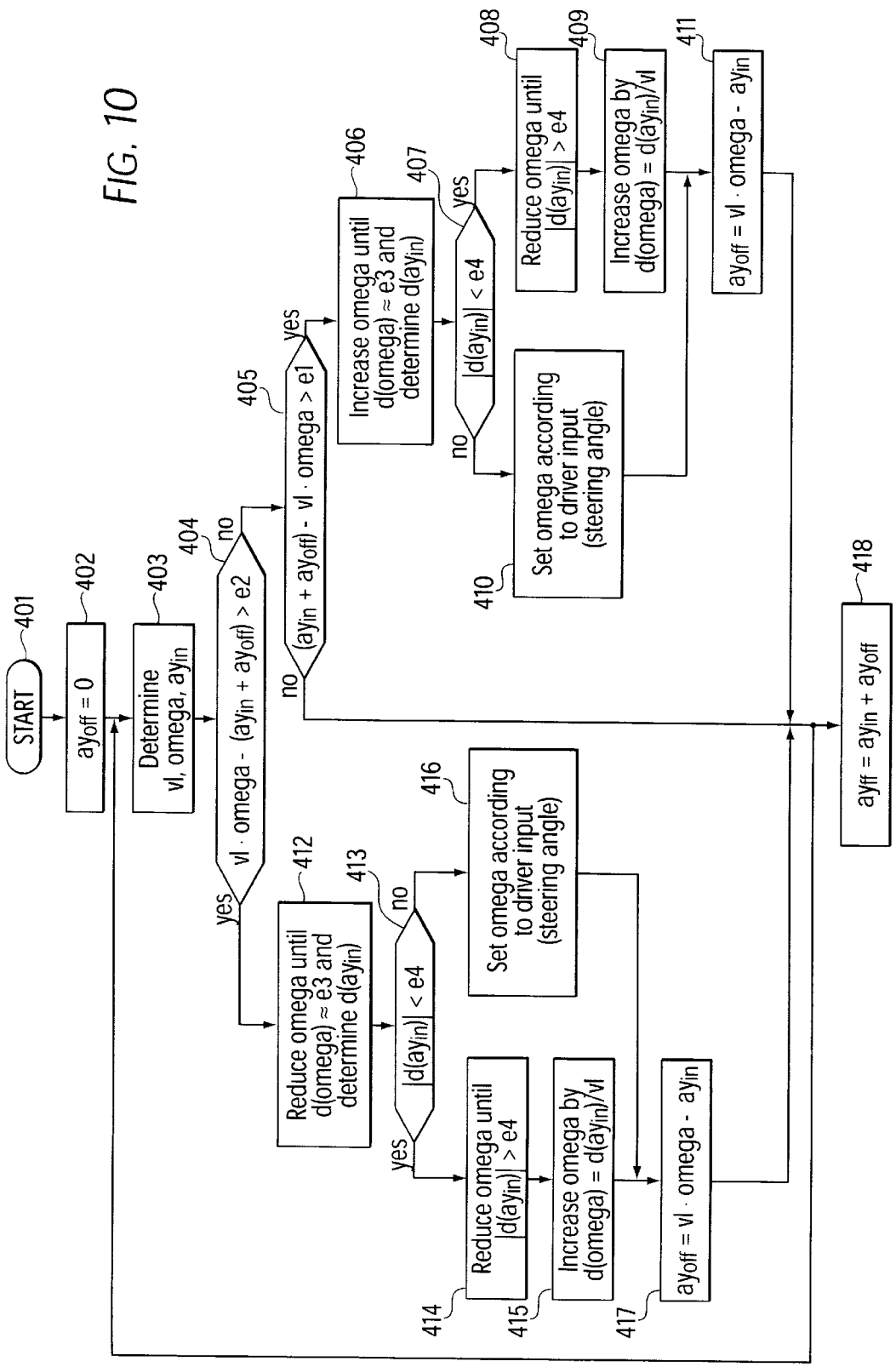

PROCESS AND APPARATUS FOR CONTROLLING IN CLOSED LOOP A MOTION QUANTITY REPRESENTING VEHICLE MOTION

BACKGROUND INFORMATION

Systems for closed loop control of the behavior of motor vehicles are known from the related art with many different modifications. For example, anti-lock control systems, as well as traction control systems are known which aim to largely maintain the usual vehicle behavior even in situations that are critical with respect to longitudinal dynamics. Moreover, control systems are also known, such as all-wheel drive under open- or closed-loop control, chassis control or driving dynamics control. The aim of these systems is to influence the vehicle such that it maintains its usual driving behavior even in situations that are critical with respect to transverse dynamics.

All of the systems named above have in common that nominal quantities are generally determined from measured and estimated quantities. By comparing these nominal quantities with actual values determined, for example, using sensors, regulated quantities are determined. Using these regulated quantities, actuators located in the vehicle are activated. Through the intervention performed by the actuators, the behavior of the vehicle is influenced such that the actual value approaches the specified nominal quantity.

For the above named systems, the importance of transverse acceleration as a measured quantity varies in importance. In some of the above named systems, an existing transverse acceleration is taken into account such that for an existing transverse acceleration, the regulated quantities that are determined to actuate the actuators are corrected as a function of its value.

Thus, for example, DE-OS 34 21 732 discloses an anti-lock control system with which the driving behavior of a vehicle is improved during a braking operation in travel through a curve. For this purpose, this anti-lock control system is equipped additionally with a transverse acceleration sensor whose measured value is compared during the braking operation with a threshold value. Where the measured values exceeds the threshold value sensor, the intake valve for the rear axle is driven such that, for at least a time period, the braking pressure in the wheel brake cylinders of the rear axle is increased only slightly or rather not at all. In this case, the rear axle maintains nearly the full lateral stability, the driving behavior of the vehicle being improved as a result during the braking operation in travel through a curve.

Likewise, DE-OS 34 21 700 discloses an anti-lock control system that is equipped with a transverse acceleration sensor. As is generally known, considerable yawing moments can occur on roadways with highly asymmetrical coefficients of friction due to a braking performed by an anti-lock control system, since the wheels on the dry-roadway vehicle side grip and retard the vehicle, but the wheels on the slippery-roadway vehicle side do not. In order to avoid the high yawing moments in this case, the braking pressure on the wheel with a higher coefficient of friction is limited as a function of the braking pressure on the wheel with a lower coefficient of friction. Admittedly, the same variable braking forces occur also when braking in curves, where a high transverse acceleration is simultaneously present. In this case, however, a limitation of the yawing moment that does not permit the optimum braking forces at the start of the braking is harmful. In order to be able to differentiate the two above named situations (braking in a curve and braking on a roadway with highly asymmetrical coefficients of friction), a conventional anti-lock control system is equipped with a transverse acceleration sensor. The measured value of the transverse acceleration sensor is compared with a specified transverse acceleration threshold. If the transverse acceleration threshold is exceeded, i.e., if travel through a curve is detected, a further pressure build-up is permitted on the wheel having the higher coefficient of friction. Thus, the yawing moment limitation is changed or rather, under certain circumstances, partially canceled. Accordingly, with the installed transverse acceleration sensor, one achieves, on the one hand, the desired driving stability when braking in a curve and, on the other hand, the desired improvement in the manageability on asymmetrical roadways.

In addition to the anti-lock control systems, the transverse acceleration can also be significant in traction control systems. German Patent 34 17 423 describes a propulsion control device for a vehicle in which the reduction of the engine torque is carried out as a function of a measured transverse acceleration. Here, it is decided as a function of a comparison of the measured value of the transverse acceleration with a specified value for the transverse acceleration whether the reduction of the engine torque, is carried out as soon as a driven vehicle wheel exhibits a wheelspin tendency or, when both driven vehicle wheels exhibit a wheelspin tendency.

As mentioned above, the transverse acceleration is taken into account inter alia also in chassis control. Thus, German Published Unexamined Application DE-OS 41 21 954 describes a process for obtaining yaw rate and/or transverse speed, to be used, for example, in chassis control. For this purpose, the transverse acceleration and the steering angles of the two axles are measured using sensors. Based on these measured quantities, the yaw rate and the vehicle transverse speed are estimated using a state estimator. These quantities can then be further processed in the context of chassis control.

The transverse acceleration is also significant in driving dynamics control systems. Such a system is disclosed, for example, by German Published Unexamined Application DE-OS 42 43 717. It describes a process for closed loop control of a vehicles stability. In this process, a yaw rate setpoint value is determined and a yaw rate actual value is measured. By comparing the two quantities, the deviation of the actual value from the setpoint value is obtained. As a function of this deviation, braking pressure control valves are driven such that an additional yawing moment is produced to adjust the actual value to the setpoint value. This application reveals two possible ways for computing the yaw rate setpoint value. This application, it shows how to compute the yaw rate setpoint value based on the steering angle and vehicle speed. This type of computation applies for the linear range. This application also shows that the yaw rate setpoint value can be computed as a function of the transverse acceleration and the vehicle speed. This type of computation applies for the nonlinear range.

In the publication "FDR-Die Fahrdynamikregelung von Bosch" [FDR-Driving dynamics control from Bosch] which appeared in "Automobiltechnische Zeitschrift" (ATZ) 96 (1994) [Automobile Engineering Journal] on pp. 674–689, a driving dynamics control system is likewise described. One skilled in the art understands from this article, e.g., in FIG. 5 on page 677, among other things, the use of a transverse acceleration sensor to measure the transverse acceleration from which estimated quantities are determined (see FIG. 4 on the same page in this context).

Based on the examples given above, it is understood that the transverse acceleration has great significance as a measured quantity in relation to closed-loop control of vehicle behavior. Under certain circumstances, a measured transverse acceleration riddled with errors can result in faulty behavior of the closed-loop control.

In the normal case, the transverse acceleration is measured using a transverse acceleration sensor. This measurement of the transverse acceleration takes place in an inertial system. Besides the transverse forces that act upon the vehicle due to the vehicle motion, the forces caused by a transversely inclined roadway also enter into the value of the measured transverse acceleration. However, the control processes described above for computing necessary quantities are based customarily on roadway-fixed coordinate systems. Such roadway-fixed coordinate systems have the property that the roadways in the systems exhibit no transverse inclination, and the transverse acceleration used therein consequently does not reflect any components brought about by a transverse inclination of the roadway. Due to this situation (measured transverse acceleration in an inertial system and required transverse acceleration in a roadway-fixed coordinate system), one would make an error if one were to use the transverse acceleration measured in the inertial system directly without compensating for this aspect of the roadway-fixed coordinate system.

In German Patent 43 25 413, a process for determining quantities characterizing the driving behavior is described in which this problem (usage of a transverse acceleration measured in an inertial system in a roadway-fixed coordinate system) is taken into account. The starting point of this process are motion equations which describe the transverse or rather longitudinal dynamics of the vehicle in the plane. These motion equations are supplemented with measurement equations based on a vehicle model. In this approach, the transverse inclination of the roadway is taken into account as a state quantity. Thus, the quantities characterizing the driving behavior can be determined which take into account the transverse inclination of the roadway. Measured quantities entering into this process are the vehicle longitudinal speed, the longitudinal acceleration of the vehicle, the transverse acceleration of the vehicle, the yaw angle speed of the vehicle, the steering angle and the wheel speeds of the individual wheels. The process is used among other things for computing the float angle.

The object of the present invention is to optimize existing systems for controlling in closed loop quantities representing vehicle motion such that in measuring the transverse acceleration, the transverse inclination of the roadway is taken into account. The determined transverse inclination of the roadway can thus be drawn upon for correcting the transverse acceleration measured in an inertial system and used in a roadway-fixed coordinate system.

SUMMARY OF THE INVENTION

The apparatus and process according to the present invention result in improved manageability of the vehicle over conventional systems.

BRIEF DESCRIPTION OF THE DRAWINGS

FIG. 10 shows the operation of a preferred embodiment of the control process according to the present invention in flowchart form.

DETAILED DESCRIPTION

The present invention provides control systems with which the vehicle behavior can be influenced; for example, anti-lock control systems, traction control systems, systems for chassis control or driving dynamics control. All of these systems have in common the fact that the control they perform takes place with respect to a roadway-fixed coordinate system.

If in any of these systems the transverse acceleration somehow enters into the control process and this is measured using a transverse acceleration sensor, it is possible to make an error due to the fact that the transverse acceleration is measured using a transverse acceleration sensor in an inertial system, but a measure of the transverse acceleration is needed in a roadway-fixed coordinate system.

To clarify this, the physical circumstances shall be considered. The transverse acceleration sensor measures a transverse acceleration in the initial system that is proportional to these forces acting in the vehicle's transverse direction. Thus, besides the transverse forces that act upon the vehicle due to the vehicle motion and which are significant for the respective control process in the roadway-fixed coordinate system, the slope descending force that comes about due to the transverse inclination of the roadway also enters into this measured transverse acceleration. Thus, if one does not correct the measured transverse acceleration, this slope descending force results in errors in the respective control process. The errors in the respective control process come about due to the fact that the transverse acceleration measured in the inertial system has components that come about due to the slope descending force, but the roadway in the roadway-fixed coordinate system exhibits no transverse inclination, and the transverse acceleration thus required for the control process may not reflect acceleration components that come about due to the slope descending force or rather due to the transverse inclination of the roadway. Through a transformation of the transverse acceleration measured in the inertial system into the roadway-fixed coordinate system, it is possible to achieve the elimination of the component of the transverse acceleration that comes about due to the transverse inclination of the roadway.

Figure 1A:
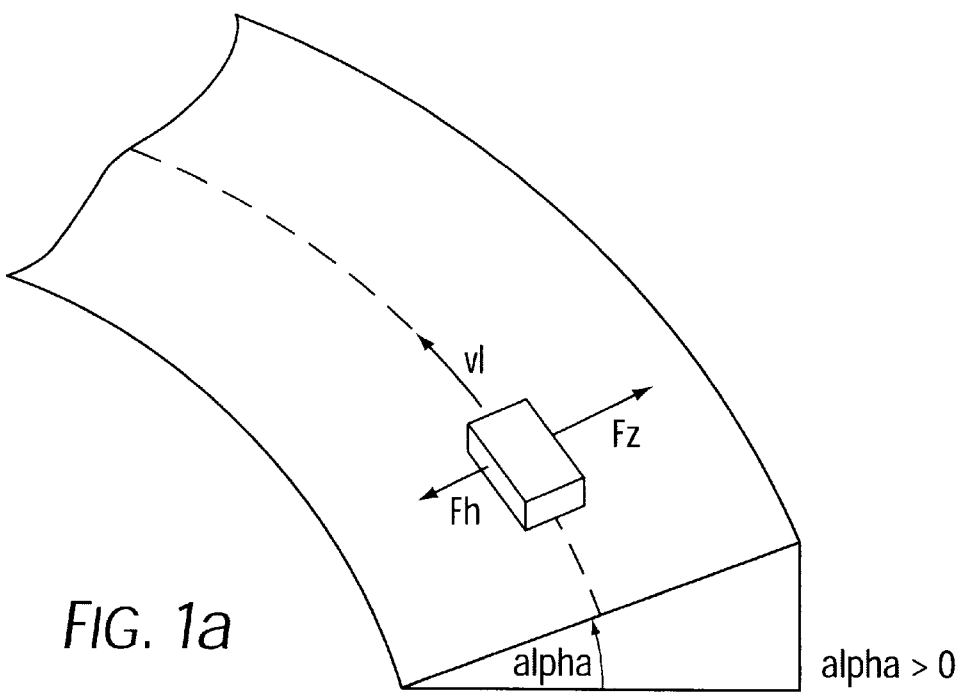
FIG. 1a shows a vehicle undergoing travel through a first curve on a transversely inclined roadway.
Figure 1B:
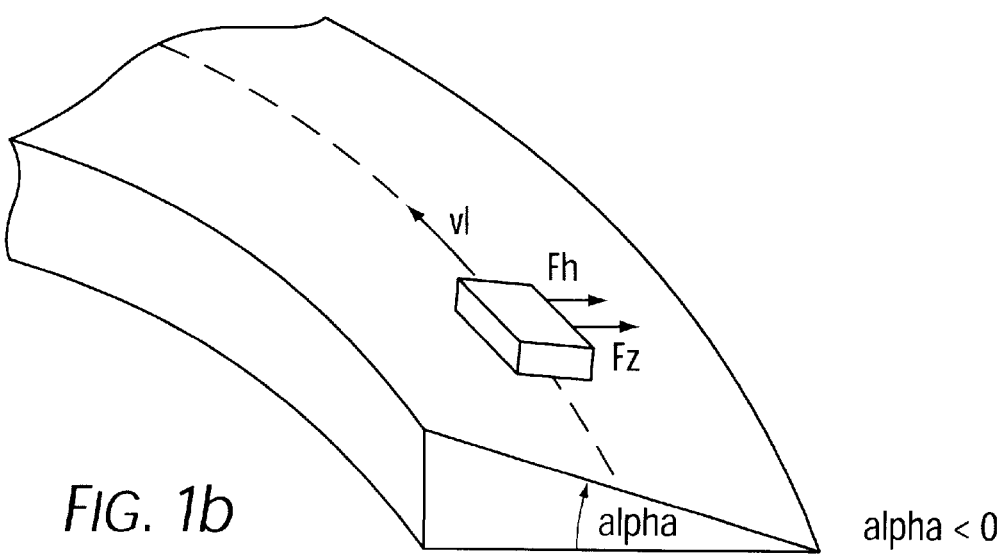
FIG. 1b shows a vehicle undergoing travel through a second curve on a transversely inclined roadway.

FIGS. 1a and 1b show a vehicle which undergoes travel through a curve on a transversely inclined roadway. In FIG. 1a, the roadway is transversely inclined such that the resultant slope descending force Fh is directed opposite to centrifugal force Fz resulting from the travel through the curve.

This means that due to the transversely inclined roadway, the value of the transverse acceleration measured by the transverse acceleration sensor is smaller in magnitude than the value that would actually be expected due to the travel through the curve.

FIG. 1b shows the case in which due to the transversely inclined roadway, slope descending force Fh and centrifugal force Fz are directed in the same direction. In this case, the transverse acceleration sensor measures a transverse acceleration that is greater in magnitude than one would expect due to the travel through the curve.

In both cases, therefore, the value of the transverse acceleration measured using the transverse acceleration sensor is corrupted by a transverse acceleration component that comes about due to the slope descending force.

Figure 2:
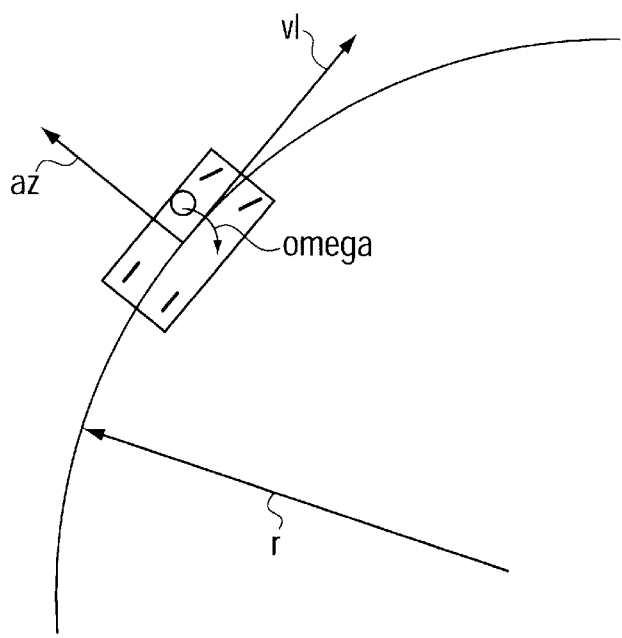
FIG. 2 shows a vehicle undergoing travel through a curve in a horizontal plane.

FIG. 2 shows travel through a curve by a vehicle in a horizontal plane. In travel through the curve in a horizontal plane, the only transverse force acting on the vehicle is centrifugal force Fz. Due to centrifugal force Fz, the centrifugal acceleration arises that is a function of vehicle longitudinal speed vl and curve radius r of the curve through which the vehicle is travelling. For the centrifugal acceleration az, the following equation results:

$$az = vl*vl/r, \tag{1}$$

which in this case (where float angle=zero) is simultaneously the transverse acceleration ayin. ayin represents the transverse acceleration measured in this case with a transverse acceleration sensor. FIG. 2 shows moreover that due to the travel through the curve, the vehicle carries out a rotary motion about its vertical axis with yaw rate omega. Yaw rate omega can be described in this case, as shown by the following equation, with vehicle longitudinal speed vl and curve radius r as follows:

$$omega = vl/r \tag{2}$$

For travel through the curve in a horizontal plane, a linear relationship generally exists between transverse acceleration ayin, in this case centrifugal acceleration az, and yaw rate omega. This can be derived, for example, from equations (1) and (2) as follows $$ayin = az = vl*omega \tag{3}$$

Figure 3:
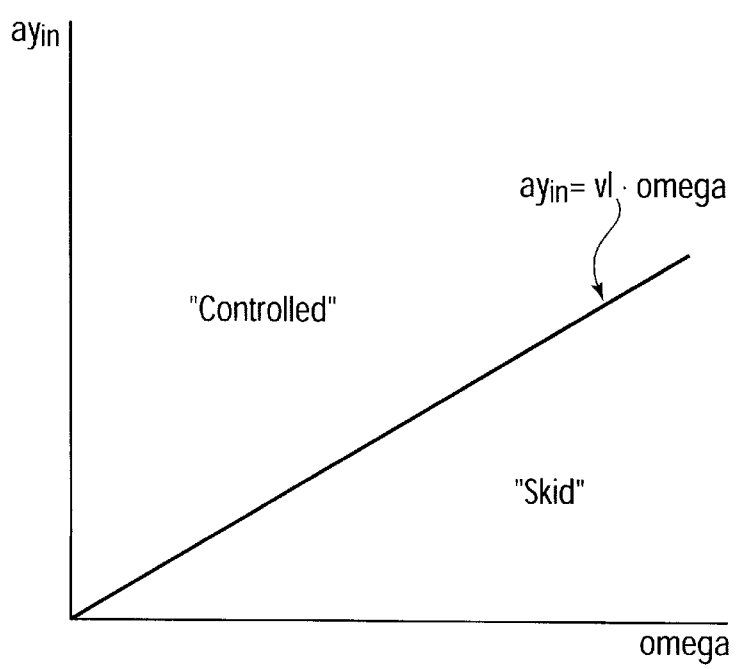
FIG. 3 shows a first graph of a relationship between a vehicle's transverse acceleration and yaw rate.

This relationship is illustrated in FIG. 3. The line drawn in the diagram divides the plane into two regions designated as "controlled" "Skid". In "controlled" region, there is stable behavior on the part of the vehicle. In the "Skid" region, however, the vehicle behavior is unstable. By measuring vehicle longitudinal speed vl, transverse acceleration ayin and yaw rate omega, one obtains an arbitrary point in this plane that characterizes the behavior of the vehicle. Points in the controlled subplane are characterized in that yaw rate omega is smaller than one would expect based on the values of transverse acceleration ayin and vehicle longitudinal speed vl. Points in the "Skid" subplane are characterized in that yaw rate omega is greater than one would expect based on the values of transverse acceleration ayin and vehicle longitudinal speed vl. Therefore, the behavior of the vehicle in the controlled subplane is understeering. In contrast, the behavior of the vehicle in the "Skid" subplane is oversteering.

If the vehicle undertakes stationary travel through a curve on a transversely inclined roadway, on the one hand centrifugal acceleration az and on the other hand a transverse acceleration component ayoff that comes about due to the transversely inclined roadway occur. Transverse acceleration component ayoff is characterized by gravitational constant g and transverse inclination angle alpha of the roadway. For the transverse acceleration component, for example, the following relationship holds:

$$ayoff = g*\sin(alpha) \tag{4}$$

In the case illustrated in FIG. 1a, the transverse acceleration sensor measures a transverse acceleration ayin that is composed of centrifugal acceleration az and a transverse acceleration component ayoff coming about due to the transverse inclination of the roadway as follows:

$$ayin = az - ayoff$$

$$= az - g*\sin(alpha), \text{ where alpha} > 0. \tag{5}$$

The relationship given in equation (1) applies for centrifugal acceleration az. As one can see, due to the positive transverse inclination angle of the roadway, the transverse acceleration ayin measured using the transverse acceleration sensor is reduced by the amount ayoff that comes about due to the slope descending force. Transverse acceleration ayin measured using the transverse acceleration sensor for the case shown in FIG. 1b is also characterized by equation (4). However, in this case transverse inclination angle alpha of the roadway is negative. Thus, the measured transverse acceleration ayin is increased by component ayoff that comes about due to the slope descending force.

Figure 4:
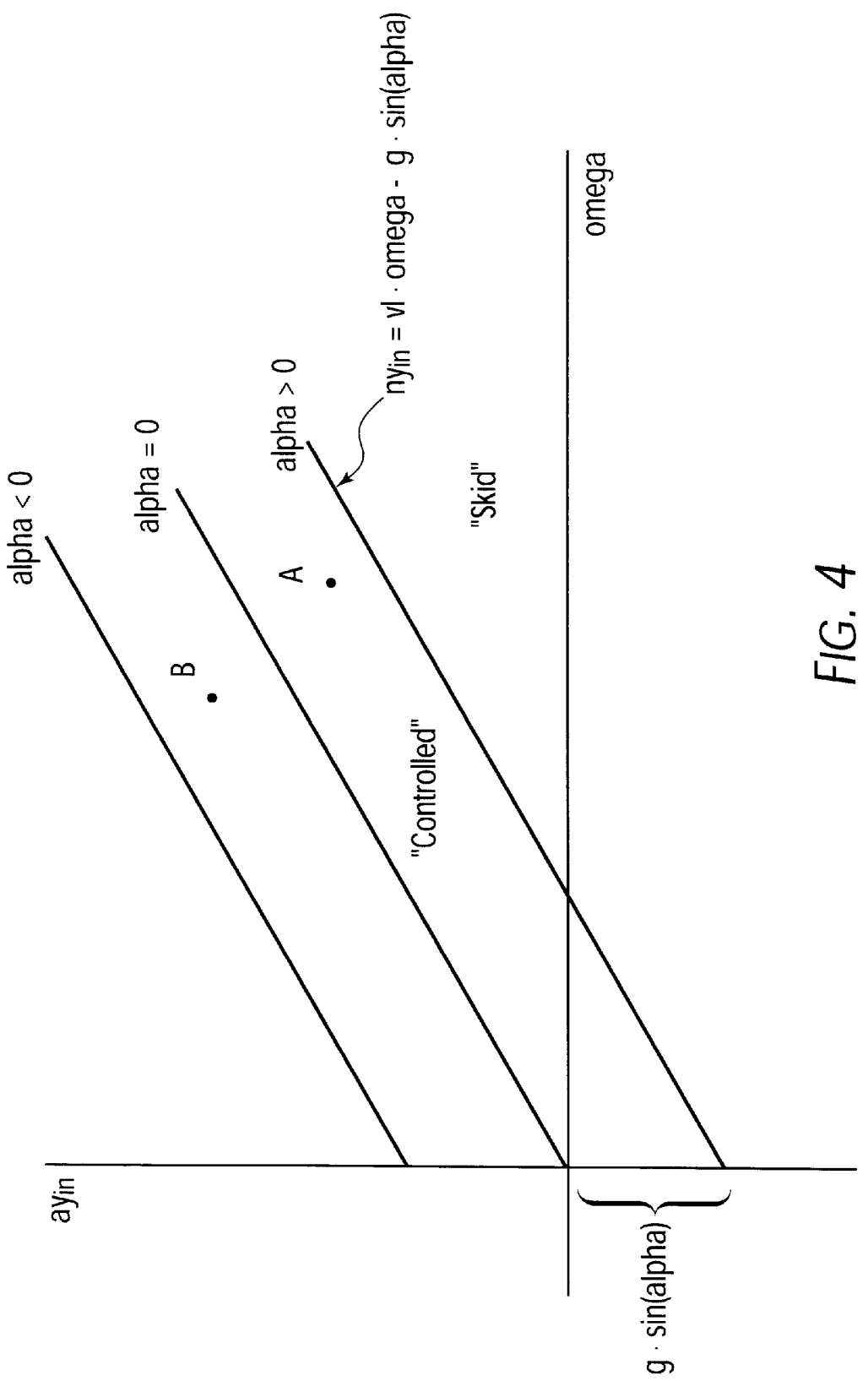
FIG. 4 shows a second graph of a relationship between a vehicle's transverse acceleration and yaw rate.

The circumstances described by equation (4) are illustrated in the diagram in FIG. 4. The situation (travel through a curve in a horizontal plane) which is shown in FIG. 2, is also illustrated in the diagram in FIG. 4 (alpha=0).

The diagram shows that transverse acceleration ayin that is measured with the transverse acceleration sensor is derived from transverse acceleration az that would be present for corresponding stationary travel through a curve in a horizontal plane and the component of transverse acceleration ayoff that comes about due to the transversely inclined roadway. Since the transverse acceleration is used for controls that operate with reference to a roadway-fixed coordinate system, this transverse acceleration may not contain acceleration components that come about due to a transversely inclined roadway. Visually this means based on FIG. 4 that the measured transverse acceleration ayin must be adjusted by the acceleration component that comes about due to the transversely inclined roadway so that it comes to lie on the lines with alpha=0.

The correction of the transverse acceleration ayin measured with the transverse acceleration sensor can be carried out if the vehicle is in a stable state "controlled" in FIG. 3. This means for the correction of transverse acceleration ayin measured with the transverse acceleration sensor that it must be initially determined whether the vehicle is in a stable state or not. If a stable state is present, then component ayoff of the transverse acceleration can be determined that comes about due to the transversely inclined roadway.

Transverse acceleration ayff required in the roadway-fixed coordinate system can be derived from transverse acceleration ayin measured with the transverse acceleration sensor and transverse acceleration component ayoff as follows:

$$ayff = ayin + g*\sin(alpha). \tag{6}$$

In order to be able to correct the transverse acceleration ayin measured by the transverse acceleration sensor in the inertial system, the transverse inclination alpha of the roadway and thus the acceleration component of the transverse acceleration caused is expressed as follows:

$$ayoff = g*\sin(alpha) \tag{7}$$

and must be determined using a detector.

In order to be able to determine the transverse inclination of the roadway or rather the component ayoff of the transverse acceleration caused by it, it must be ensured, as was already mentioned, that the vehicle is in a stable state. Therefore, before a possible correction of the transverse acceleration, can be determined it must initially be investigated whether the vehicle is in a stable state.

Figure 5:
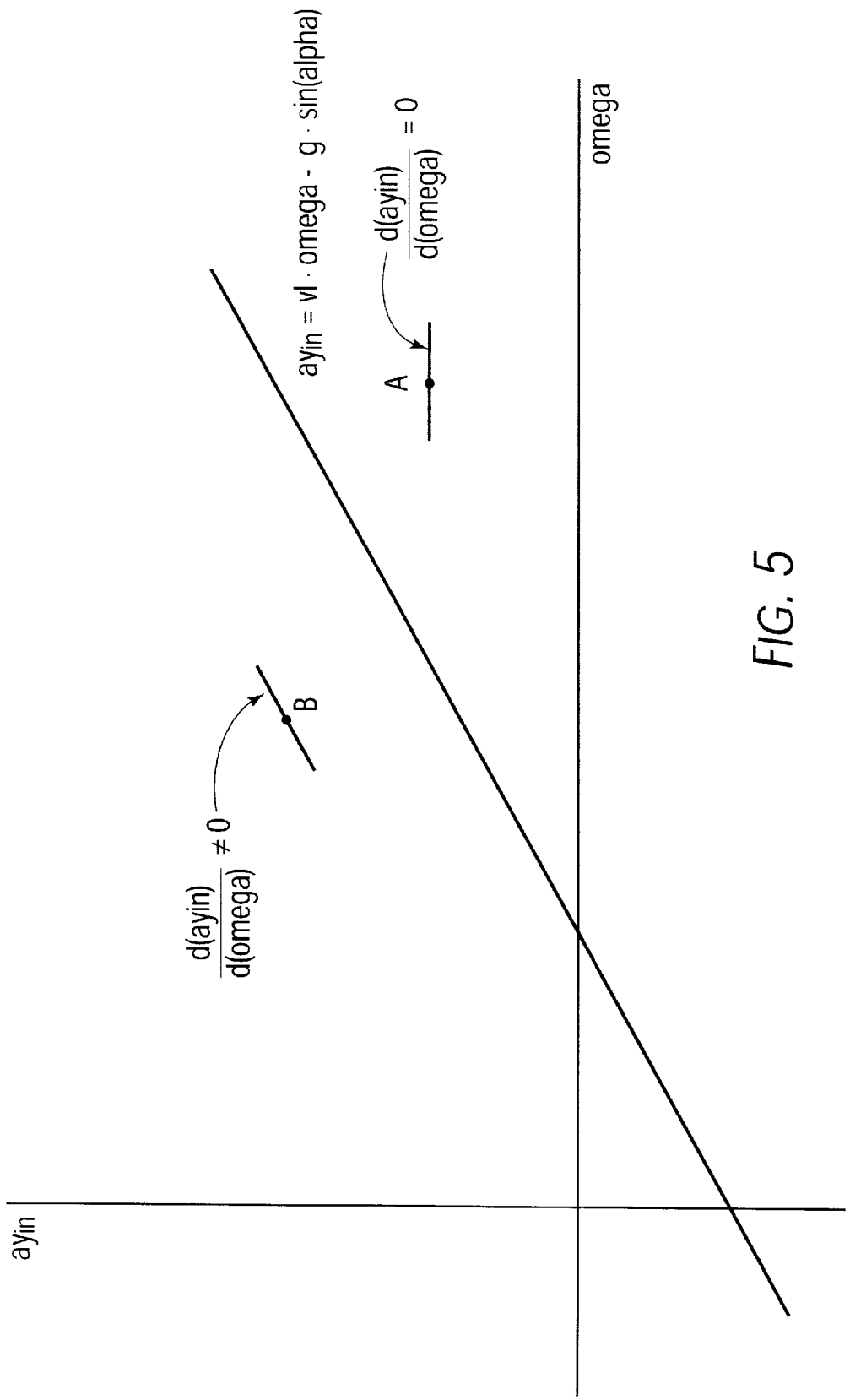
FIG. 5 shows a third graph of a relationship between a vehicle's transverse acceleration and yaw rate.

The criterion which can be used to distinguish whether the vehicle is in a stable or in an unstable state shall first be explained based on FIG. 4 and then based on FIG. 5.

FIG. 4 illustrates the influence of the transversely inclined roadway on the transverse acceleration ayin measured with the transverse acceleration sensor. As FIG. 4 shows, the line for the transverse acceleration is shifted due to the transversely inclined roadway. Thus, it can no longer be clearly determined whether the vehicle is in a stable controlled or in an unstable state ("Skid") as a function of the measured valued for transverse acceleration ayin, yaw rate omega and vehicle longitudinal speed vl.

Based on FIG. 5, an exemplary method is shown which can be used to determine which state the vehicle is in. Here, the following property is used: If a vehicle is in an unstable state (the vehicle "skids" or rather oversteers), then in the normal case the tire, transverse forces no longer suffice to maintain the track guidance corresponding to the driver's wish. The yaw rate that must be set based on vehicle longitudinal speed vl and the steering angle delta specified by the driver is treated as the driver's desired yaw rate. The tire transverse forces hardly change any more for increasing slip angle of the wheels. This means that measured transverse acceleration ayin is approximately constant and thus almost independent of yaw rate omega. Expressing these circumstances mathematically, this means that the differential that is formed as a function of yaw rate change d(omega) and transverse acceleration change d(ayin) is equal to zero:

$$d(ayin)/d(omega)=0. \tag{8}$$

This situation is indicated in FIG. 5 with point A.

If, on the other hand, the vehicle is in a stable state (the vehicle "controlled" or understeers), then the tire transverse forces are sufficient for track guidance corresponding to the yaw rate of the vehicle specified as the driver's wish. Therefore, yaw rate omega can be increased corresponding to driver input. Mathematically expressed, this means that the differential described above is not equal to zero:

$$d(ayin)/d(omega)=0. \tag{9}$$

This situation is indicated in FIG. 5 with point B.

Accordingly, differential d(ayin)/d(omega) is suitable for determining the vehicle behavior with regard to the states "Skid" (unstable vehicle behavior) or rather "controlled" (stable vehicle behavior).

For determining the vehicle behavior with regard to the two states, there are several possibilities, some of which are named below as examples. However, the limitation to these named possibilities should not be seen as a limitation of the present invention.

A first exemplary method is to have performed at certain time intervals in each case a short active, i.e., independent of the sequence of the control intervention by the control system. Based on the vehicle behavior in response to this active intervention, differential d(ayin)/d(omega) and thus the present behavior of the vehicle can then be determined.

A second exemplary method consists of using interventions of the control system carried out in conjunction with the control process to determine differential d(ayin)/d(omega) from the vehicle behavior following thereupon.

A third exemplary method presents itself, starting from an immediately upcoming control process intervention due to the driving behavior of the vehicle, to carry out an active intervention of the control system independent of this and based on the vehicle behavior obtained in this manner to determine differential d(ayin)/d(omega).

Figure 6:
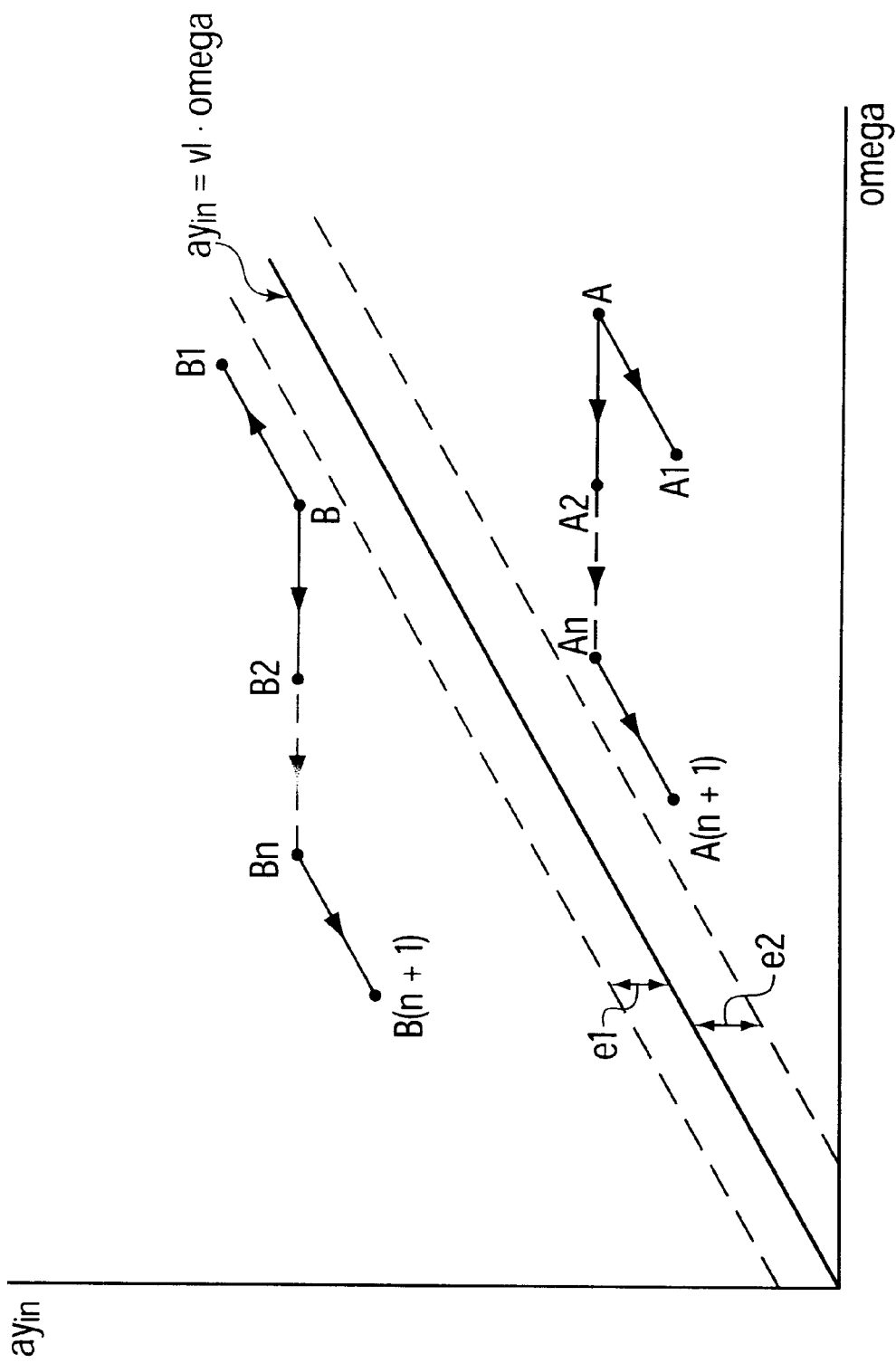
FIG. 6 shows the concept of the closed-loop control process of the present invention.

Based on FIG. 6, it is described hereafter how the detection with regard to the vehicle behavior can proceed using differential d(ayin)/d(omega). Here, it is assumed that the detection takes place, for example, according to the above described first exemplary method. However, this should not represent a limitation.

Since the roadway transverse inclination is unknown, it is initially assumed in detecting the vehicle behavior that it is zero. For this reason, the transverse acceleration component that comes about due to the transverse inclination of the roadway is initially set to zero:

$$ayoff = g*\sin(alpha)=0 \tag{10}$$

In a first example, it is assumed that through the determination of the quantities vehicle longitudinal speed vl, transverse acceleration ayin and yaw rate omega of the vehicle, the vehicle behavior is described by point A contained in the diagram in FIG. 6. Therefore, the control system assumes in this case that the vehicle is in an unstable state ("Skid"). Here, differential d(ayin)/d(omega) has the value zero. This state is characterized in that yaw rate omega of the vehicle is too large for the present driving situation. Therefore, the control system undertakes a first intervention through which yaw rate omega of the vehicle is initially reduced by a small amount. The control system simultaneously monitors the change in transverse acceleration ayin.

There are now two possibilities for the situation that can be present after the first intervention. The first case can be present in which despite the performed change that in yaw rate omega, no change in transverse acceleration ayin has occurred (point A2). This is equivalent to saying that differential d(ayin)/d(omega) has remained unchanged and equal to zero despite the first intervention. If this is determined, then an unstable vehicle state is actually present, the vehicle is "skidding". To bring the vehicle from this unstable state to a stable state in which the component of transverse acceleration ayoff that comes about due to the transverse inclination of the roadway can be determined, an arbitrary number of further interventions must be performed by the control system under certain circumstances, as indicated in FIG. 6. After carrying out these further interventions, point An is defined based on the quantities the vehicle's longitudinal speed vl, transverse acceleration ayin and yaw rate omega. Until reaching this point, no change in transverse acceleration ayin would have occurred despite the change in yaw rate omega. Due to the next following intervention of the control system, a change in transverse acceleration ayin occurs (point A(n+1)). The change that occurs in transverse acceleration ayin causes differential d(ayin)/d(omega) to assume a value other than zero, which is equivalent to saying that the vehicle had reached a stable state upon reaching point An. The control system performs a further intervention such that the result of the last intervention is canceled. The vehicle is thus back in the state described by point An. Starting from the values present at this point for vehicle longitudinal speed vl, yaw rate omega of the vehicle and transverse acceleration ayin, the component $$ayoff = g*\sin(\text{alpha}) = vl*\text{omega} - ayin \qquad (11)$$

of the transverse acceleration can now be computed that comes about due to the transversely inclined roadway. With this value ayoff and the transverse acceleration ayin measured by the transverse acceleration sensor, the transverse acceleration ayff required in the roadwayfixed coordinate system can be determined:

$$ayff = ayin + ayoff. \qquad (12)$$

In this first case, the vehicle is actually in an unstable state at the start, which was also assumed based on the values for vehicle longitudinal speed vl, transverse acceleration ayin and yaw rate omega at point A.

The second case that can be present as a result of the first intervention above is one in which transverse acceleration ayin changes as a result of the first intervention of the control system (point A1). If this occurs, component ayoff of the transverse acceleration can be determined already after the first intervention of the control system. For this purpose, the control system performs likewise, as described above for the first exemplary method, initially a further intervention so that the vehicle again assumes the state described by point A. Based on the values determined in this state for vehicle longitudinal speed vl, yaw rate omega and transverse acceleration ayin, component ayoff of the transverse acceleration is determined. The case is therefore present that the vehicle is in a stable state although due to the present first values for vehicle longitudinal speed vl, yaw rate omega and transverse acceleration ayin at point A, it was assumed that it would be in an unstable state.

In a second example, it is assumed that through the determination of the quantities vehicle longitudinal speed vl, transverse acceleration ayin and yaw rate omega of the vehicle, the point B contained in the diagram in FIG. 6 is present. In this case, the control system assumes that the vehicle is in a stable state. Such a state is characterized in that yaw rate omega of the vehicle is too small for the present driving situation. This corresponds to understeering behavior of the vehicle. Since yaw rate omega is too small, the control system performs a first intervention through which it is initially increased by a small amount. It simultaneously monitors the change in the transverse acceleration through measurement.

Here as well, analogous to the first example, two cases must again be distinguished. The first case that can be present that due to the first intervention of the control system, a change in transverse acceleration ayin occurs (point B1). If this is the case, then component ayoff of the transverse acceleration can be determined already after the first intervention of the control system. To be able to do this, the control system performs, as already described above in the first example, initially a further intervention so that the vehicle again assumes the state described by point B. Based on the values present in this state for vehicle longitudinal speed vl, yaw rate omega and transverse acceleration ayin, component ayoff of the transverse acceleration is determined. In this overall third case, the vehicle is at the start actually in a stable state, which was also assumed based on the values for vehicle longitudinal speed vl, transverse acceleration ayin and yaw rate omega at point B.

The second case that can be present in this second example is that despite the first intervention by the control system and the associated change in yaw rate omega, no change in transverse acceleration ayin occurred (point B2). This means that differential d(ayin)/d(omega) remained unchanged and equal to zero despite the first intervention. If this is determined, then an unstable vehicle state is actually present. To bring the vehicle into a stable state in which the component of transverse acceleration ayoff can be determined, an arbitrary number of further interventions must be performed by the control system under certain circumstances, as indicated in FIG. 6. After they are carried out, the point Bn is described based on the quantities vehicle longitudinal speed vl, transverse acceleration ayin and yaw rate omega. Until reaching this point, no change in transverse acceleration ayin would have occurred despite the change in yaw rate omega. Due to the next following intervention of the control system, a change in transverse acceleration ayin occurs (point B(n+1)). The change that occurs in transverse acceleration ayin causes differential d(ayin)/d(omega) to assume a value other than zero. This means that the vehicle had reached a stable state upon reaching point Bn. The control system performs a further intervention through which the vehicle is brought back to the state described by point Bn. According to equation (11), component ayoff can now be computed. Based on this value ayoff and the transverse acceleration ayin measured by the transverse acceleration sensor, the transverse acceleration that is required in the roadway-fixed coordinate system can be computed according to equation (12).

In this case, the vehicle was in an unstable state at the start although based on the values for vehicle longitudinal speed vl, yaw rate omega of the vehicle and transverse acceleration ayin at point B, a stable state of the vehicle was assumed.

One additionally derives from the diagram in FIG. 6 that a tolerance band lies about the line that fulfills the relationship ayin=vl*omega. As in the illustrated case, this tolerance band can lie asymmetrically about the line. For example, it can have a spacing towards the "top" described by value e1 and a spacing towards the "bottom" described by value e2. If it is determined based on measurement of the values for vehicle longitudinal speed vl, transverse acceleration ayin and yaw rate omega of the vehicle that the vehicle is in a state lying within the tolerance band, no active intervention is performed by the control system since it is assumed in this case that on the one hand the vehicle is in a stable state and on the other hand the transverse inclination of the roadway may have remained unchanged. In the description for FIG. 10, this tolerance band is treated in greater depth.

Figure 7:
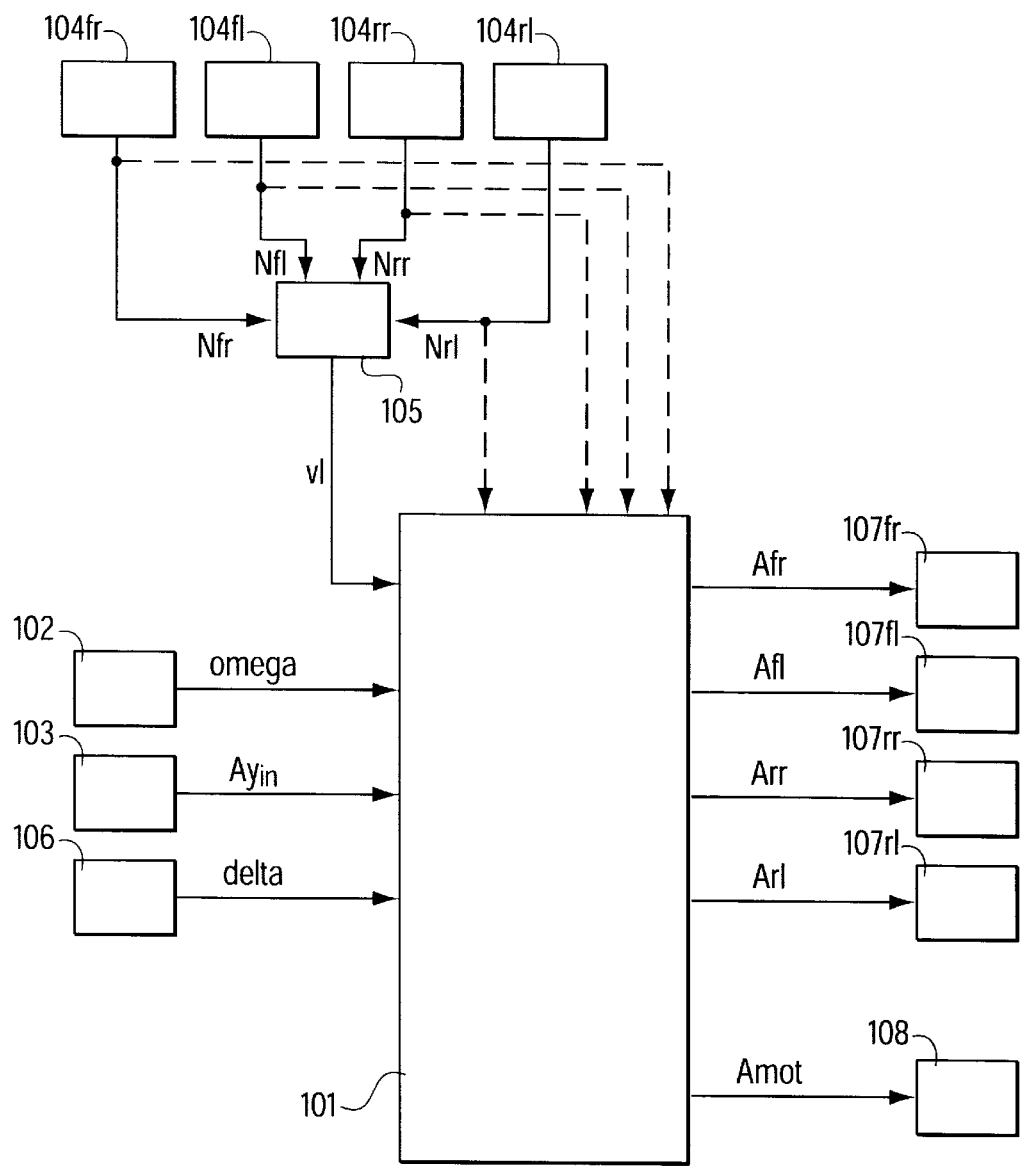
FIG. 7 shows a block diagram illustrating a preferred embodiment of the control system according to the present invention.

Based on the considerations hitherto that were presented mainly using FIG. 6, a control system is described hereafter with reference to FIG. 7, the control system containing means which can be used to determine transverse inclination alpha of the roadway and thus transverse acceleration component ayoff that comes about due to it. Here, it is assumed, for example, that this control system is a system for closed loop control of the driving dynamics of the vehicle. However, this should not represent a limitation of the usage of the idea of the present invention in another system for closed loop control of the other behaviors of motor vehicles.

As shown in FIG. 7, the control system contains a block 101. Various measured signals are fed to this block 101. One of these signals is yaw rate omega of the vehicle about its vertical axis measured using sensor 102. Sensor 102 can be built, for example, as a single rotation rate sensor for measuring the yaw rate or as a combination of two transverse acceleration sensors situated at different locations in the vehicle. Transverse acceleration ayin measured using sensor 103 is fed to block 101 as a further signal. A further signal fed to block 101 is steering angle delta measured using steering angle sensor 106. With wheel rotational speed sensors 104ij, wheel rotational speeds Nij of the individual wheels are measured. Here, index i indicates whether the respective sensor is located on the rear axle or the front axle of the vehicle. The index j indicates the assignment to the left or right vehicle side. So the "fr" in the 104fr would be the rotational speed in the front right wheel, and the "rr" in 104rr would be the rotational speed in the rear right wheel, etc. This also applies to actuators 107ij. The measured wheel rotational speeds are fed on the one hand directly to block 101. On the other hand they are fed to a block 105. Using block 105, vehicle longitudinal speed vl is determined in a known manner based on signals Nij. Vehicle longitudinal speed vl is likewise fed to block 101.

Using block 101, drive signals Aij or rather Amot are generated in a known manner. Reference is made, for example, to the publication "FDR-Die Fahrdynamikregelung von Bosch" which appeared in "Automobiltechnische Zeitschrift". Actuators 107ij are driven by drive signals Aij. With these actuators, for example, the braking forces of individual wheels can be influenced in a wheel-selective manner. Drive signal Amot is fed to block 108. As a function of drive signal Amot, the motive force generated by the engine is influenced in a known manner, for example, through influencing of the throttle-value setting or the firing point.

Figure 8:
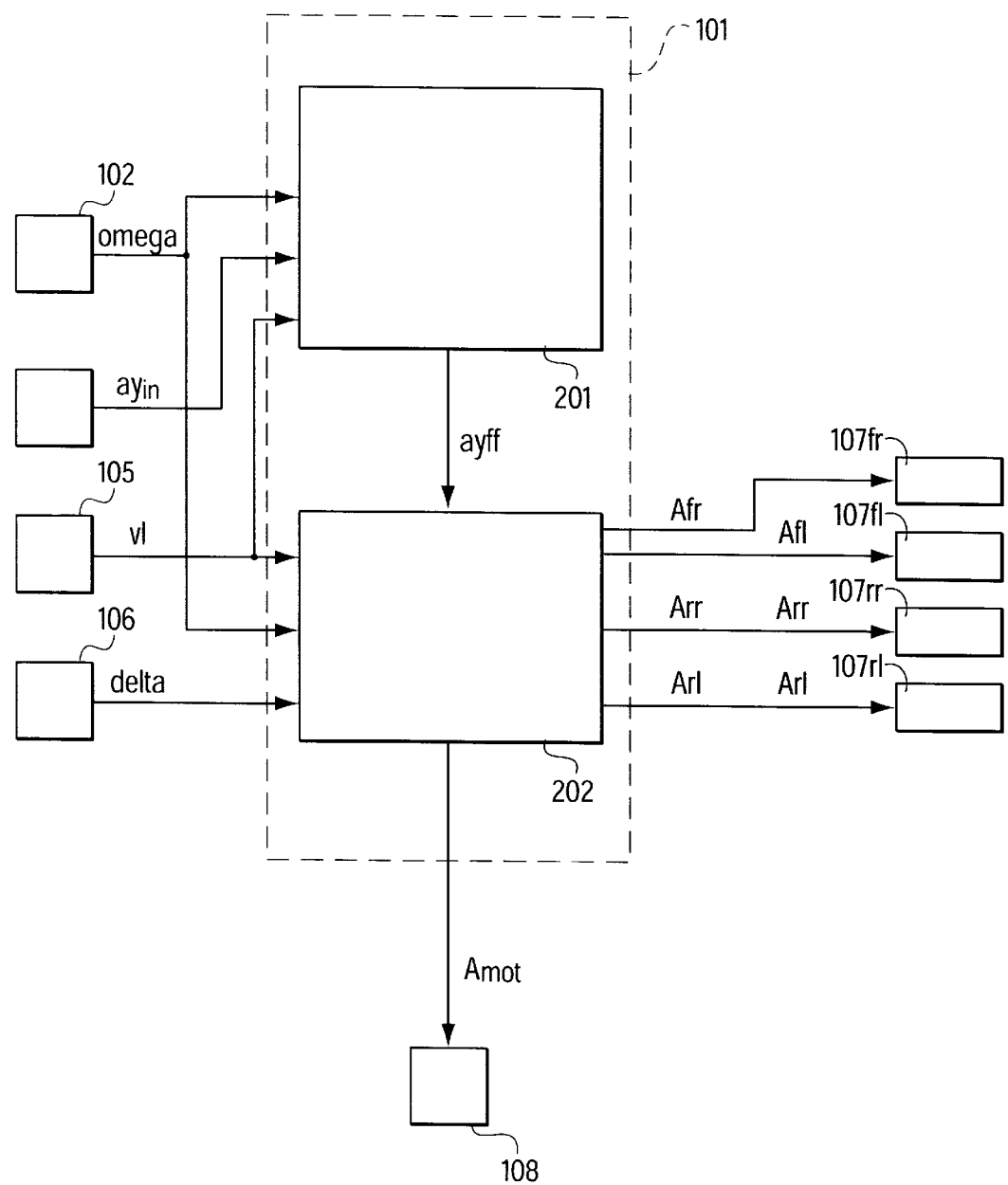
FIG. 8 shows a block diagram illustrating block 101 from FIG. 7 in more detail.

The function of block 101 is described in more detail in FIG. 8. As FIG. 8 shows, block 101 consists of two blocks 201 and 202. The signals already described in conjunction with FIG. 7 (yaw rate omega, transverse acceleration ayin measured using a sensor and vehicle longitudinal speed vl) are fed to block 201. Based on these three signals, transverse acceleration ayff required in the roadway-fixed coordinate system is determined in block 201. This transverse acceleration ayff as well as yaw rate omega, vehicle longitudinal speed vl and steering angle delta are fed to block 202. This block 202 forms drive signals Aij or rather Amot in a known manner from these signals. Refer to the article "FDR-Die Fahrdynamikregelung von Bosch" in "Automobiltechnische Zeitschrift".

Figure 9:
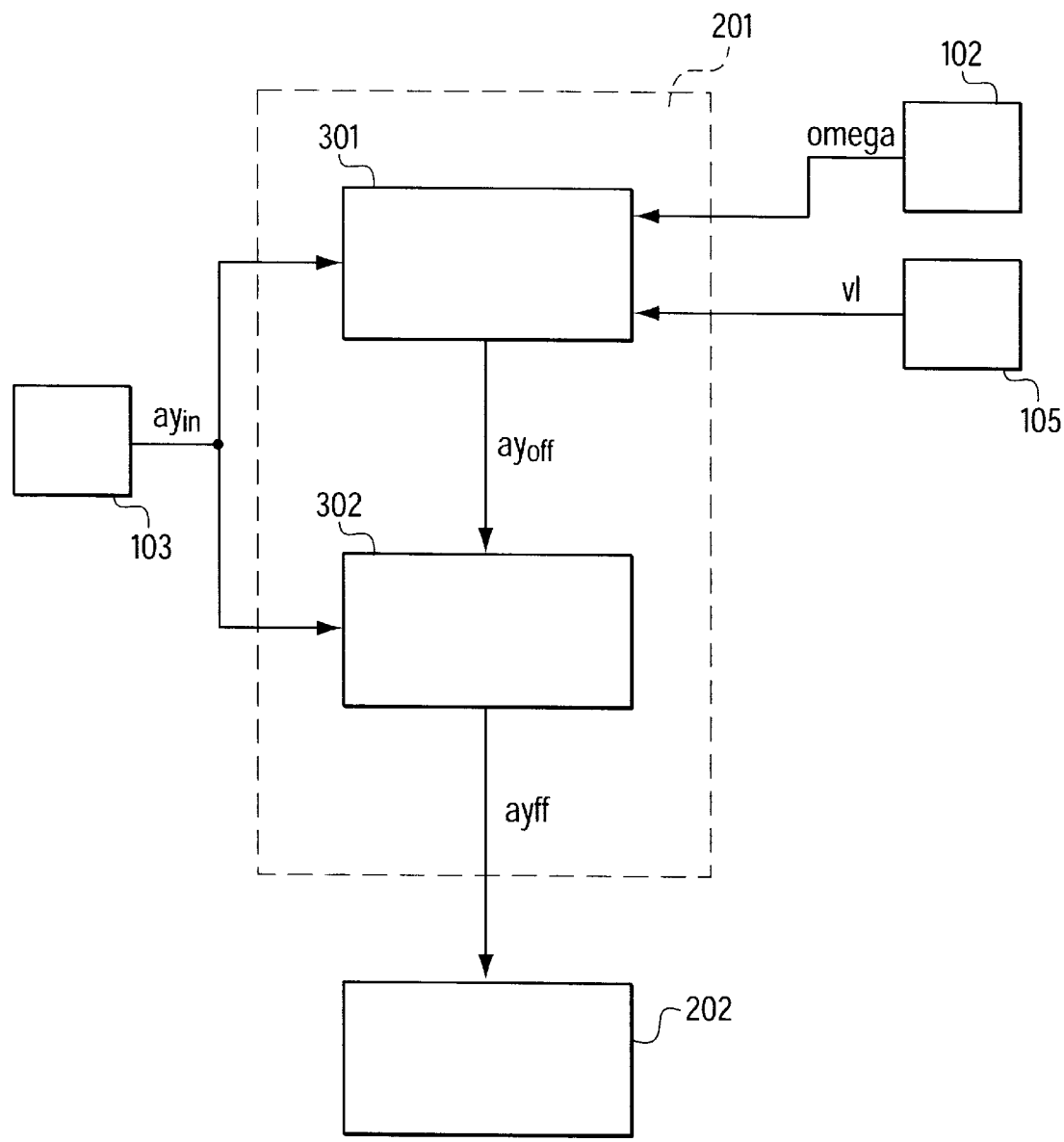
FIG. 9 shows a block diagram illustrating block 201 from FIG. 8 in more detail.

Based on FIG. 9, the structure of block 201 is described in greater detail. Block 201 consists of two blocks 301 and 302. The signals already mentioned above for yaw rate omega, vehicle longitudinal speed vl and transverse acceleration ayin are fed to block 301. Based on these three signals, block 301 forms the transverse acceleration component ayoff coming about due to the transverse inclination of the roadway. This is fed to block 302. The signal for transverse acceleration ayin is fed additionally to block 302. As a function of signals ayin and ayoff, block 302 forms transverse acceleration ayff required in the roadway-fixed coordinate system. This is fed to block 202.

With the flowchart in FIG. 10, the process executing in block 201 for determining transverse acceleration component ayoff or transverse acceleration ayff required in the roadway-fixed coordinate system shall be described in greater detail. It should be noted beforehand that in this flowchart the time delay between a change in yaw rate omega due to an intervention of the control system and the possibly associated change in transverse acceleration ayin is neglected. Additionally in this exemplary embodiment, a tolerance band lies about the curved defined by alpha=0 (see FIG. 6). This tolerance band does not need to be arranged symmetrically about the curve. The tolerance band is realized with the two threshold values e1 or rather e2.

Beginning with the turning of the ignition key at the start of the trip, the process for determining transverse acceleration component ayoff coming about due to the transverse inclination of the road begins with step 401. In this step, any necessary initializations are performed. Since at the start of the trip there is as yet no information about the transverse inclination of the roadway, the value for transverse acceleration component ayoff is set to zero in a further step 402. Step 402 is executed only directly after actuating the ignition key. As soon as transverse acceleration component ayoff is determined the first time, the process no longer begins with step 402 but rather with step 403. In this step 403, the values for vehicle longitudinal speed vl, transverse acceleration ayin measured using a transverse acceleration sensor and yaw rate omega of the vehicle are read in.

In subsequent step 404, the difference between the value for the transverse acceleration that was computed based on the measured value of yaw rate omega, the measured value of vehicle longitudinal speed vl and the last determined value of transverse acceleration component ayoff and the value ayin of the transverse acceleration measured with the transverse acceleration sensor is formed. The difference that arises here is compared with a threshold value e2. Through this query, based on the state of the vehicle that is described by the measured values for vehicle longitudinal speed vl, transverse acceleration ayin and yaw rate omega of the vehicle, it is determined whether the vehicle is in a state underneath the tolerance band or not. If the difference is less than threshold value e2, then the control system assumes that the vehicle is either in a stable state or in a state lying within the tolerance band. Step 405 is executed as the next step. If on the other hand, the difference is greater than threshold e2, the control system assumes that the vehicle is in an unstable state and step 412 is executed as the next step.

After a first comparison performed in step 404 of the transverse acceleration ayin measured using a transverse acceleration sensor with a value computed from the measured values for vehicle longitudinal speed vl, yaw rate omega and transverse acceleration component ayoff, a further comparison is performed in step 405. For this purpose, the difference from the value ayin of the transverse acceleration measured with the transverse acceleration sensor and the value of the transverse acceleration that was computed based on the measured value of yaw rate omega, the measured value of vehicle longitudinal speed vl and the last determined value of transverse acceleration component ayoff is formed. This difference is compared with threshold value e1. Through this query, it is thus determined corresponding to the procedure in step 404 whether the vehicle in this case is in a state above the tolerance band or not. If the difference is greater than threshold value e1, then the control system assumes that the vehicle is in a stable state and executes step 406 as the next step. However, if the difference is smaller than threshold value e2, then the control system assumes that the vehicle is in a state within the tolerance band. This means that the vehicle is in a state that can be considered stable and that the transverse inclination of the roadway has hardly changed. Thus, the process is continued by looping back step 403 and also in step 418 the transverse acceleration ayff required for the roadway-fixed coordinate system is determined and outputted.

If it was determined in step 405 that the difference formed there is greater than threshold value e1, then the control system assumes that the vehicle is in a stable state. Therefore, in step 406 the yaw rate omega of the vehicle is increased until its change d(omega) has approximately reached threshold value e3 in order to be able to suppress smaller disturbances. The increase in yaw rate omega can take place, for example, in one step or in multiple substeps.

After reaching threshold value e3 through the change d(omega) in the yaw rate, the change d(ayin) of the transverse acceleration is determined.

In a next step 407, the amount of change d(ayin) of the transverse acceleration determined in step 406 is compared with a threshold value e4. If the amount of change d(ayin) of the transverse acceleration is smaller than threshold value e4, then differential d(ayin)/d(omega) is nearly zero. The control system detects in this manner that the vehicle is in an unstable state although it assumed based on the decision results in steps 404 and 405 that the vehicle was in a stable state. Step 408 is executed next. However, if the amount of change d(ayin) of the transverse acceleration is greater than threshold value e4, which is equivalent to saying that d(ayin)/d(omega) is clearly not equal to zero, then the control system recognizes that the vehicle is in a stable state. Step 410 is thus executed next.

If it was determined in step 407 that the change d(ayin) of the transverse acceleration is less than threshold value e4, then the vehicle is in an unstable state. Therefore, in a step 408, yaw rate omega of the vehicle is reduced through interventions of the control system until it is determined that the amount of change of transverse acceleration d(ayin) is greater than threshold value e4. As soon as the amount of change d(ayin) of the transverse acceleration is greater than threshold value e4, differential d(ayin)/d(omega) is clearly not equal to zero, and thus the vehicle is in a stable state. Step 409 is executed as the next step.

In step 409, the reduction of the yawing moment last performed in step 408 is canceled again by a corresponding intervention of the control system. In this manner the vehicle is returned to the stable state it was just before the intervention. Step 411 follows next.

If it was determined in step 407 that the amount of change d(ayin) of the transverse acceleration is greater than threshold value e4, then the vehicle is in a stable state. In step 410, accordingly, yaw rate omega of the vehicle is set at least as a function of steering angle delta specified by the driver. Step 411 is then executed as the next step.

In step 411, since the vehicle is in a stable state, transverse acceleration component ayoff that comes about due to the transverse inclination of the roadway is determined. Transverse acceleration component ayoff is determined as a function of the values measured in the stable state for vehicle longitudinal speed vl, yaw rate omega of the vehicle and transverse acceleration ayin. After determining transverse acceleration component ayoff, the process is continued by looping back to with step 403. Also, based on the transverse acceleration component ayoff determined in step 411, the transverse acceleration ayff required in the roadway-fixed coordinate system is determined in step 418.

If it was determined in step 404 that the difference formed there is greater than threshold value e2, then the control system assumes that the vehicle is in an unstable state. Therefore, in a block 412, yaw rate omega of the vehicle is reduced until its change d(omega) has approximately reached threshold value e3. The reduction of yaw rate omega can take place, for example, in one step or in multiple substeps. After reaching threshold value e3 through the change d(omega) in the yaw rate, the change d(ayin) of the transverse acceleration is determined.

In a further step, the amount of change d(ayin) of the transverse acceleration is compared with a threshold value e4 in a step 413, according to the procedure in block 407. If the amount of change d(ayin) of the transverse acceleration is less than threshold value e4, then the assumption of the control system that the vehicle is in an unstable state is confirmed. Step 414 is executed next. However, if the amount of change d(ayin) of the transverse acceleration is greater than threshold value e4, then the control system recognizes that the vehicle is in a stable state although it assumed based on the decision result in step 404 that the vehicle was in an unstable state. Accordingly, step 416 is executed next.

If it was determined in step 413 that the change d(ayin) of the transverse acceleration is less than threshold value e4, then the vehicle is in an unstable state. The procedure in step 414 corresponds to that in step 408. Step 415 is executed as the next step.

In step 415 which follows step 414, a correction of the intervention last performed in step 414 is carried out, likewise analogous to the procedure in step 409.

If it was determined in step 413 that the amount of change d(ayin) of the transverse acceleration is greater than threshold value e4, then the vehicle is in a stable state. In step 416, accordingly, yaw rate omega of the vehicle is set at least as a function of steering angle delta specified by the driver. Step 417 is then executed as the next step.

In step 417, analogous to the procedure in step 411, transverse acceleration component ayoff that comes about due to the transverse inclination of the roadway is determined. After determining transverse acceleration component ayoff, the process is continued by looping back to step 403. Also, based on the transverse acceleration component ayoff determined in step 417, the transverse acceleration ayff necessary in the roadway-fixed coordinate system is determined in step 418.

Due to the fact that after both steps 411 or rather 417 in each case a return to step 403 is made, the process runs continuously. Based on the transverse acceleration ayff computed in step 418 and required in the roadway-fixed coordinate system, this is thus continually updated and made available for further processing in other parts of the control system.

It can be particularly advantageous if, for example, filtering of the measured values for vehicle longitudinal speed vl, transverse acceleration ayin and yaw rate omega is performed.

What is claimed is:

1. An apparatus for a closed loop control of a motion quantity indicative of a motion of a vehicle, comprising:
    means for determining a yaw rate of the vehicle;
    means for determining a longitudinal speed of the vehicle;
    means for determining a transverse acceleration of the vehicle;
    means for determining a stable state of the vehicle, the stable state being determined as a function of at least one of the yaw rate and the transverse acceleration;
    means for adjusting at least one of a forward moment and a braking moment of at least one wheel of the vehicle;
    means for determining a first transverse acceleration component, the first transverse acceleration component being a function of a transverse inclination of a roadway; and
    means for correcting the transverse acceleration of the vehicle as a function of the first transverse acceleration component,
    wherein the determination of the first transverse acceleration component and the correction of the transverse acceleration are performed in the stable state of the vehicle.

2. The apparatus according to claim 1, wherein the stable state is determined by a change in the transverse acceleration as a function of a change in the yaw rate.

3. The apparatus according to claim 2, wherein the transverse acceleration is corrected as a function of at least one of a first comparison of the change in the yaw rate with a third threshold value and a second comparison of the change in the transverse acceleration with a fourth threshold value.

4. The apparatus according to claim 1, wherein the first transverse acceleration component is determined as a function of the yaw rate, the longitudinal speed and the transverse acceleration, the function expressed by the following equation:

$$vl*\text{omega}-ayin,$$

where
vl is the longitudinal speed;
omega is the yaw rate; and
ayin is the transverse acceleration,
and wherein the yaw rate, the longitudinal speed and the transverse acceleration are determined in the stable state of the vehicle.

5. The apparatus according to claim 1, further comprising:
means for determining a steering angle of a steering wheel in the vehicle; and
means for determining a plurality of rotational speeds of a corresponding plurality of wheels of the vehicle.

6. The apparatus according to claim 5, wherein the means for determining the yaw rate includes at least one of a yaw rate sensor and a first and second transverse acceleration sensor, the first transverse acceleration sensor being disposed in a first location in the vehicle and the second transverse acceleration sensor being disposed in a second location in the vehicle different from the first location, wherein the means for determining the transverse acceleration includes a transverse acceleration sensor, and wherein the longitudinal speed is determined as a function of the plurality of rotational speeds of the corresponding plurality of wheels of the vehicle.

7. The apparatus according to claim 1, wherein the correction of the transverse acceleration is performed as a function of at least one of a first comparison of a first relationship between the longitudinal speed, the yaw rate, the transverse acceleration, and the first transverse acceleration component with a first threshold value and a second comparison of a second relationship between the longitudinal speed, the yaw rate, the transverse acceleration, and the first transverse acceleration component with a second threshold value, the first relationship being expressed by the following equation:

$$vl*\text{omega}-(ayin+ayoff)$$

where
vl is the longitudinal speed;
omega is the yaw rate;
ayin is the transverse acceleration; and
ayoff is the first transverse acceleration component,
and the second relationship being expressed by the following equation:

$$(ayin+ayoff)-vl*\text{omega}$$

where
vl is the longitudinal speed;
omega is the yaw rate;
ayin is the transverse acceleration; and
ayoff is the first transverse acceleration component.

8. The apparatus according to claim 1, wherein the transverse acceleration is corrected as a function of the transverse acceleration and the first transverse acceleration component, the function expressed by the following equation:

$$ayin+ayoff$$

where
ayin is the transverse acceleration; and
ayoff is the first transverse acceleration component.

9. The apparatus according to claim 1, wherein:
the adjusting means is controlled as a function of at least the corrected transverse acceleration.

10. A process for a closed loop control of a motion quantity indicative of a motion of a vehicle, the process comprising the steps of:
determining a yaw rate of the vehicle;
determining a longitudinal speed of the vehicle;
determining a transverse acceleration of the vehicle using a transverse acceleration sensor;
determining a stable state of the vehicle, the stable state being determined as a function of at least one of the yaw rate and the transverse acceleration;
determining a first transverse acceleration component in the stable state, the first transverse acceleration component being a function of a transverse inclination of a roadway and being determined as a function of the yaw rate, the longitudinal speed, and the transverse acceleration; and
determining a corrected transverse acceleration of the vehicle in the stable state, the corrected transverse acceleration of the vehicle being a function of the transverse acceleration and the first transverse acceleration component.

11. The process according to claim 3, wherein the first transverse acceleration component is set to a predetermined value at a starting point of the process.

12. The process according to claim 11, wherein the predetermined value is approximately equal to zero.

13. An apparatus for a closed loop control of a motion quantity indicative of a motion of a vehicle, comprising:
an arrangement for determining a yaw rate of the vehicle;
an arrangement for determining a longitudinal speed of the vehicle;
an arrangement for determining a transverse acceleration of the vehicle using a transverse acceleration sensor;
an arrangement for determining a stable state of the vehicle, the stable state being determined as a function of at least one of the yaw rate and the transverse acceleration;
an arrangement for determining a first transverse acceleration component in the stable state, the first transverse acceleration component being a function of a transverse inclination of a roadway and being determined as a function of the yaw rate, the longitudinal speed, and the transverse acceleration; and
an arrangement for determining a corrected transverse acceleration of the vehicle in the stable state, the corrected transverse acceleration of the vehicle being a function of the transverse acceleration and the first transverse acceleration component.

* * * * *